(12) United States Patent
Hirano et al.

(10) Patent No.: US 11,642,871 B2
(45) Date of Patent: May 9, 2023

(54) SURFACE-TREATED METAL PLATE FOR POLYOLEFIN BONDING, COMPOSITE MEMBER, AND METHOD FOR MANUFACTURING COMPOSITE MEMBER

(71) Applicant: Kobe Steel, Ltd., Kobe (JP)

(72) Inventors: Yasuo Hirano, Kakogawa (JP);
Tatsuhiko Iwa, Kakogawa (JP);
Tetsuya Yamamoto, Kakogawa (JP);
Takeshi Watase, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 123 days.

(21) Appl. No.: 16/498,020

(22) PCT Filed: Feb. 21, 2018

(86) PCT No.: PCT/JP2018/006105
§ 371 (c)(1),
(2) Date: Sep. 26, 2019

(87) PCT Pub. No.: WO2018/180025
PCT Pub. Date: Oct. 4, 2018

(65) Prior Publication Data
US 2020/0023616 A1    Jan. 23, 2020

(30) Foreign Application Priority Data

Mar. 29, 2017 (JP) .............................. JP2017-066113

(51) Int. Cl.
| | |
|---|---|
| *B32B 15/085* | (2006.01) |
| *B29C 45/14* | (2006.01) |
| *B32B 7/12* | (2006.01) |
| *B32B 27/32* | (2006.01) |
| *C09J 151/06* | (2006.01) |
| *B29C 45/26* | (2006.01) |

(52) U.S. Cl.
CPC ............ *B32B 15/085* (2013.01); *B29C 45/14* (2013.01); *B32B 7/12* (2013.01); *B32B 27/32* (2013.01); *C09J 151/06* (2013.01); *B29C 45/26* (2013.01); *B32B 2250/02* (2013.01); *B32B 2255/06* (2013.01); *B32B 2255/26* (2013.01); *B32B 2307/538* (2013.01)

(58) Field of Classification Search
CPC ...... C09J 151/06; C09J 7/28; C09J 123/0869; C09D 151/06; C08L 51/06; C08L 23/0869; C08L 23/26; C08L 51/003; C08L 2205/02; C08L 2205/025; B32B 15/085; B32B 7/12; B32B 15/08
See application file for complete search history.

(56) References Cited

U.S. PATENT DOCUMENTS

| | | | |
|---|---|---|---|
| 2013/0096247 A1* | 4/2013 | Takahashi | ................ C08K 3/04 |
| | | | 524/505 |
| 2013/0338284 A1 | 12/2013 | Ito et al. | |
| 2017/0058159 A1* | 3/2017 | Lee | ........ B32B 27/306 |
| 2018/0305592 A1* | 10/2018 | Yokomichi | ............. B32B 27/32 |
| 2019/0177568 A1* | 6/2019 | Nakajima | ............ C09D 123/26 |
| 2019/0224951 A1* | 7/2019 | Zennyoji | ................. B32B 27/32 |

FOREIGN PATENT DOCUMENTS

| | | | |
|---|---|---|---|
| EP | 2 946 921 A1 | 11/2015 | |
| EP | 3 434 470 A1 | 1/2019 | |
| JP | 2003-94562 A | 4/2003 | |
| JP | 2016-179546 A | 10/2016 | |
| WO | WO 2015/033703 A1 | 3/2015 | |
| WO | WO-2017073153 A1 * | 5/2017 | ............. B32B 27/00 |
| WO | WO 2017/163817 A1 | 9/2017 | |

OTHER PUBLICATIONS

Extended European Search Report dated Mar. 4, 2020 in European Patent Application No. 18776346.1, 14 pages.
English translation of the International Preliminary Report on Patentability dated Oct. 10, 2019 in PCT/JP2018/006105 filed Feb. 21, 2018, 8 pages.
International Search Report dated Apr. 10, 2018 in PCT/JP2018/006105 filed Feb. 21, 2018.

\* cited by examiner

*Primary Examiner* — Monique R Jackson
(74) *Attorney, Agent, or Firm* — Oblon, McClelland, Maier & Neustadt, L.L.P.

(57) ABSTRACT

A surface-treated metal sheet for adhesion to polyolefin includes a metal sheet, and a resin layer provided on at least one surface of the metal sheet. The resin layer contains an acid-modified polyolefin, the acid-modified polyolefin contains a first acid-modified polyolefin having an acid value of 5 mgKOH/g or less, particularly 4 to 5 mgKOH/g, and a second acid-modified polyolefin having an acid value of 20 mgKOH/g or more and a melting point of higher than 90° C., and a difference between a melting point of the first acid-modified polyolefin and the melting point of the second acid-modified polyolefin is 0° C. or more and less than 40° C. The resin layer has a surface roughness of 12 μm or less in terms of arithmetic average roughness Ra.

5 Claims, No Drawings

SURFACE-TREATED METAL PLATE FOR POLYOLEFIN BONDING, COMPOSITE MEMBER, AND METHOD FOR MANUFACTURING COMPOSITE MEMBER

TECHNICAL FIELD

The present invention relates to a surface-treated metal sheet for adhesion to polyolefin, a composite member, and a method for manufacturing a composite member.

BACKGROUND ART

In automobiles, home electric appliances, office automation (OA) devices and the like, many metal components including a metal sheet have been used. In most of the metal components, a metal sheet is pressed into a predetermined shape and then the metal sheet is bonded to another metal component, a plastic component or the like by welding, screw cramping or the like upon use.

On the other hand, when the adhesiveness to a plastic can be imparted to the surface of a metal sheet, a composite member in which the metal sheet and the plastic are bonded to each other can be manufactured by pressing the metal sheet, then placing the metal sheet in a mold for plastic molding use, then injecting the plastic in a molten form into the mold, and then solidifying the molten plastic by cooling. Therefore, the metal sheet imparted with the adhesiveness to a plastic can contribute to the increase in efficiency of a process for manufacturing the member and the reduction in weight of the member.

As the method for imparting the adhesiveness to plastics to the surface of the metal sheet, a method of providing a resin layer such as an adhesive agent layer capable of being bonded to a plastic and a metal sheet on the surface of the metal sheet is considered. Specifically, there is a method in which the adhesive agent composition disclosed in Patent Literature 1 is used.

In Patent Literature 1, an adhesive agent composition is disclosed, which contains an organic solvent, a polyolefin resin which is dissolved in the organic solvent, has a melt flow rate of 5 to 40 g/10 min as measured at 130° C. and has a carboxyl group, and a polyfunctional isocyanate compound. According to Patent Literature 1, it is disclosed that the adhesive agent composition can exhibit sufficient adhesive strength when used for the bonding to a polyolefin resin molded article.

As the above-mentioned resin layer (adhesive agent layer) that can be used for imparting the adhesiveness to plastics to the surface of a metal sheet, a hot-melt adhesive agent can be used usefully which can be melted by heating to exhibit the adhesiveness to plastics and can have high strength upon being solidified by cooling. As the method for imparting the adhesiveness to plastics to the surface of a metal sheet using the hot-melt adhesive agent, there is a method in which a solution prepared by dissolving or dispersing the hot-melt adhesive agent in a solvent is applied onto the metal sheet. The method has high productivity, is inexpensive, and can manufacture a surface-treated metal sheet having such a configuration that a resin layer such as an adhesive agent layer capable of bonding to a plastic and a metal sheet is provided on the surface of a metal sheet.

On the other hand, as the plastic to be bonded to the metal sheet, there are various types of plastics. Among these plastics, a polyolefin, e.g., polypropylene, has been widely used in the field of automobiles and the like due to the low cost and high strength thereof. In these situations, a surface-treated metal sheet having excellent adhesiveness to polyolefins has been demanded.

CITATION LIST

Patent Literature

Patent Literature 1: International Publication No. 2012/090646

SUMMARY OF INVENTION

The present invention has been made in view of these circumstances, and an object of the present invention is to provide a surface-treated metal sheet for adhesion to polyolefin having excellent adhesiveness to a metal sheet and a polyolefin. Another object of the present invention is to provide a composite member in which the adhesion between a metal sheet and a polyolefin is excellent, and a method for manufacturing the composite member.

One aspect of the present invention is a surface-treated metal sheet for adhesion to polyolefin including a metal sheet, and a resin layer provided on at least one surface of the metal sheet, wherein the resin layer contains an acid-modified polyolefin, the acid-modified polyolefin contains a first acid-modified polyolefin having an acid value of 5 mgKOH/g or less and a second acid-modified polyolefin having an acid value of 20 mgKOH/g or more and a melting point of higher than 90° C., and a difference between a melting point of the first acid-modified polyolefin and the melting point of the second acid-modified polyolefin is 0° C. or more and less than 40° C.

The above-mentioned objects and another objects, characteristic features and benefits of the present invention will become apparent from the following detailed description.

MODE FOR CARRYING OUT THE INVENTION

The present inventors have focused attention on the fact that, when a polyolefin is used as a plastic to be bonded to a surface-treated metal sheet, a layer manufactured by using a hot-melt adhesive agent containing an acid-modified polyolefin or the like can be used preferably as a resin layer to be used for imparting the adhesiveness to the plastic to the surface of the metal sheet. As the hot-melt adhesive agent containing an acid-modified polyolefin, the adhesive agent composition disclosed in Patent Literature 1 can be mentioned, for example.

However, according to the studies made by the present inventors, in the conventional methods in which the adhesive agent composition disclosed in Patent Literature 1 and the like are used, the adhesion between a surface-treated metal sheet and a polyolefin that is a plastic to be bonded to the surface-treated metal sheet is sometimes insufficient. Therefore, it has been demanded to further improve the adhesiveness to a polyolefin. Namely, it has been demanded that, in a composite member composed of the metal sheet mentioned above and a plastic bonded to each other, the adhesion between the metal sheet provided in the surface-treated metal sheet and a polyolefin that is the plastic becomes more superior.

The present inventors have made various studies. As a result, it is found that the above-mentioned object to provide a surface-treated metal sheet for adhesion to polyolefin which has excellent adhesiveness to a metal sheet and a polyolefin can be achieved by the present invention described below.

According to the studies made by the present inventors, attention is focused on the fact that, for forming a resin layer (adhesive agent layer) containing an acid-modified polyolefin on a metal sheet, a dispersion prepared by dispersing the acid-modified polyolefin in a solvent is often used rather than a solution prepared by dissolving the acid-modified polyolefin in a solvent. This is because the dispersion has a lower viscosity compared with the solution containing the acid-modified polyolefin at the same level as that in the dispersion and therefore the dispersion can be applied more easily. The acid-modified polyolefin is a component produced by adding an acid component such as maleic anhydride to a polyolefin such as polypropylene. It is known that an acid-modified polyolefin having a smaller acid addition amount can be dissolved more poorly. Therefore, as the acid-modified polyolefin to be used for forming the resin layer on the metal sheet, an acid-modified polyolefin having a relatively smaller acid addition amount is preferably used. Thus, for the purpose of manufacturing a surface-treated metal sheet for adhesion to polyolefin which has more superior adhesiveness to a metal sheet and a plastic, the present inventors have studied in detail on a surface-treated metal sheet manufactured by forming a resin layer on a metal sheet using an acid-modified polyolefin having a relatively smaller acid addition amount. As a result, it is found that, when the dispersion is applied on a metal sheet, a layer formed on the metal sheet does not become completely uniform and has an aggregated structure in which particles are partially fused to each other. Specifically, the resin layer has void spaces formed therein, and the formation of relatively large protrusions and depression on the surface is confirmed.

A composite member is manufactured by bonding a molten plastic to the surface-treated metal sheet. Therefore, it is believed that, even if the surface roughness of the surface-treated metal sheet is large, the plastic to be bonded can follow the surface shape of the surface-treated metal sheet. For this reason, the surface roughness of the surface-treated metal sheet has not been less well studied. However, the present inventors have studied with focusing the attention to the surface roughness of a resin layer. As a result, it is found that the surface roughness of the resin layer greatly influences on the adhesiveness to a plastic. The present invention is conceived based on this finding.

Hereinbelow, embodiments of the present invention will be described. However, the present invention is not limited to these embodiments.

The surface-treated metal sheet for adhesion to polyolefin according to an embodiment of the present invention is provided with a metal sheet and a resin layer provided on at least one surface of the metal sheet. Namely, the surface-treated metal sheet for adhesion to polyolefin may be provided with the resin layer on one surface of the metal sheet or both surfaces of the metal sheet. The resin layer contains an acid-modified polyolefin, wherein the acid-modified polyolefin contains a first acid-modified polyolefin having an acid value of 5 mgKOH/g or less and a second acid-modified polyolefin having an acid value of 20 mgKOH/g or more and a melting point of higher than 90° C., and a difference between a melting point of the first acid-modified polyolefin and the melting point of the second acid-modified polyolefin is 0° C. or more and less than 40° C.

The surface-treated metal sheet for adhesion to polyolefin has excellent adhesiveness to a metal sheet and a polyolefin. The reason for this is assumed as follows.

Firstly, the resin layer containing the acid-modified polyolefin is a layer which can be melted by heating (e.g., heating at 200° C. or higher) to exert the adhesiveness to a plastic and can have high strength upon being solidified by cooling, i.e., a layer containing a hot-melt adhesive agent. As mentioned above, the resin layer containing the hot-melt adhesive agent can exert good adhesiveness to a metal sheet and a plastic. In other words, the resin layer is cooled and solidified at, for example, −40 to 125° C. during the actual use of the surface-treated metal sheet for adhesion to polyolefin, and can exert adhesiveness to a plastic satisfactorily in this state. The resin layer is a layer containing the first acid-modified polyolefin and the second acid-modified polyolefin as the acid-modified polyolefin. The resin layer is generally formed by applying a coating solution containing the acid-modified polyolefin. When the first acid-modified polyolefin is introduced into a solvent, a dispersion having the first acid-modified polyolefin dispersed in the solvent is prepared, rather than a solution having the first acid-modified polyolefin dissolved in the solvent. When the dispersion is used to form the resin layer on the metal sheet, the surface roughness tends to increase. In contrast, when a dispersion containing the first acid-modified polyolefin as well as the second acid-modified polyolefin is used, a resin layer having higher smoothness can be formed. Namely, when both of the first acid-modified polyolefin and the second acid-modified polyolefin are contained, the resin layer can have such high smoothness that the arithmetic average roughness Ra, which is a measure of the surface roughness, becomes 12 μm or less. It is considered that, when the smoothness of the surface of the resin layer is high, the formation of void spaces on the interface between the resin layer and a plastic to be bonded to the resin layer can be suppressed, and therefore the adhesiveness to the plastic can be improved. With respect to the resin layer, it is considered that, when the acid-modified polyolefin is contained, an acid moiety in the acid-modified polyolefin contributes to the increase in the adhesiveness to the metal sheet. As a result, it is considered that a surface-treated metal sheet for adhesion to polyolefin having excellent adhesiveness to a metal sheet and a plastic can be manufactured. Furthermore, even when a polyolefin is used as the plastic, the surface-treated metal sheet for adhesion to polyolefin can have excellent adhesiveness to the plastic. This is probably because the chemical structure of the acid-modified polyolefin and the chemical structure of the polyolefin that is used as the plastic are similar to each other and therefore the resin layer that is melted by heating and the polyolefin that is the plastic to be bonded to the surface-treated metal sheet for adhesion to polyolefin are dissolved in each other. For these reasons, the surface-treated metal sheet for adhesion to polyolefin has excellent adhesiveness to a metal sheet and a polyolefin.

The metal sheet to be used in this embodiment is not particularly limited, as long as the metal sheet can be used as the metal sheet in the surface-treated metal sheet. The metal sheet may include a metal substrate and another layer, e.g., a chemical conversion film, provided on the metal substrate, or may include only a metal substrate without such layer. Examples of the metal substrate include: a steel sheet such as a cold-rolled steel sheet (e.g., a non-plated cold-rolled steel sheet), a hot-dip galvanized steel sheet, a hot-dip galvannealed steel sheet (a hot-dip Zn—Fe galvannealed steel sheet), a hot-dip Zn-5%-Al galvannealed steel sheet, an electrogalvanized steel sheet, a Zn—Ni electrogalvanized steel sheet and GALVALUME steel sheet (registered trademark); and also an aluminum sheet and a titanium sheet. Among these sheets, a hot-dip galvanized steel sheet, an electrogalvanized steel sheet, an aluminum sheet and a titanium sheet are preferred, and a hot-dip galvannealed steel sheet is more preferred. The metal sheet may be subjected to chromate conversion coating or may not be subjected to chromate conversion coating, and is preferably not subjected to chromate conversion coating. The thickness of the metal sheet is not particularly limited, and is preferably about 0.3 to 3.2 mm from the viewpoint of the reduction in the weight of a final product. The chemical conversion film is not particularly limited, and may be, for example, a layer manufactured from a coating solution containing a resin, colloidal silica, a silane coupling agent and the like.

The resin layer to be used in this embodiment is a layer which can achieve the bonding between the metal sheet and the plastic. The bonding between the metal sheet and the plastic can be achieved in the following manner. Firstly, the bonding between the resin layer and the metal sheet can be achieved by applying the resin layer onto the metal sheet to form the surface-treated metal sheet for adhesion to polyolefin. Subsequently, the resin layer provided in the surface-treated metal sheet for adhesion to polyolefin is brought into contact with the molten plastic, and then the resin layer and the plastic are solidified by cooling to achieve the bonding between the resin layer and the plastic. Namely, the resin layer is also melted upon the contact of the molten plastic with the resin layer, and consequently the resin layer and the plastic are partially solubilized in each other to achieve good bonding between the resin layer and the plastic. In this manner, the bonding of the resin layer to the metal sheet and the plastic can be achieved.

As mentioned above, the resin layer contains the acid-modified polyolefin. The acid-modified polyolefin contains the first acid-modified polyolefin and the second acid-modified polyolefin.

The first acid-modified polyolefin is not particularly limited, as long as the acid value is 5 mgKOH/g or less. The first acid-modified polyolefin is an acid-modified polyolefin that can be used as the above-mentioned acid-modified polyolefin having a relatively small acid addition amount, and an example thereof is an acid-modified polyolefin that cannot be dissolved in an aromatic hydrocarbon solvent. The upper limit value of the acid value of the first acid-modified polyolefin is preferably 5 mgKOH/g or less. The lower limit value of the acid value of the first acid-modified polyolefin is 4 mgKOH/g or more, preferably 4.5 mgKOH/g or more. If the acid value of the first acid-modified polyolefin is too small, the dispersibility of the first acid-modified polyolefin in a solvent may become too poor and therefore the surface roughness of the resin layer may not be decreased satisfactorily even if the second acid-modified polyolefin is added. As a result, the adhesion of between the plastic and the resin layer may be deteriorated. If the acid value of the first acid-modified polyolefin is too high, the difference from the acid value of the second acid-modified polyolefin may become small and therefore the effect due to the addition of the acid modified polyolefin having a relatively small acid addition amount, e.g., heat resistance, may be deteriorated. The acid value of the acid-modified polyolefin can be measured by a potentiometric titration method prescribed in DIN EN ISO 2114.

The lower limit value of the melting point of the first acid-modified polyolefin is preferably 130° C. or higher, more preferably 140° C. or higher. The upper limit value of the melting point of the first acid-modified polyolefin is preferably 180° C. or lower, more preferably 170° C. or lower. If the melting point of the first acid-modified polyolefin is too low, the heat resistance may be decreased. If the melting point of the first acid-modified polyolefin is too high, the difference from the melting point of the second acid-modified polyolefin may become too large. As a result, the surface roughness of the resin layer may not be decreased satisfactorily and therefore the adhesion between the plastic and the resin layer may be deteriorated. This is probably because, when the difference between the melting point of the first acid-modified polyolefin and the melting point of the second acid-modified polyolefin is too large, the compatibility of the first acid-modified polyolefin with the second acid-modified polyolefin may decrease.

The lower limit value of the number average molecular weight of the first acid-modified polyolefin is preferably 5,000 or more, more preferably 10,000 or more. The upper limit value of the number average molecular weight of the first acid-modified polyolefin is preferably 150,000 or less, more preferably 100,000 or less. If the molecular weight of the first acid-modified polyolefin is too small, the melting point of the first acid-modified polyolefin may be lowered, leading to the deterioration in heat resistance. If the molecular weight of the first acid-modified polyolefin is too large, the resin layer is less likely to be compatible with the plastic and therefore the adhesive strength may be deteriorated.

The second acid-modified polyolefin is not particularly limited, as long as the acid value is 20 mgKOH/g or less, the melting point is higher than 90° C. and the difference between the melting point of the second acid-modified polyolefin and the melting point of the first acid-modified polyolefin is 0° C. or more and less than 40° C. An example of the second acid-modified polyolefin is an acid-modified polyolefin that can be dissolved in an aromatic hydrocarbon solvent.

The lower limit value of the acid value of the second acid-modified polyolefin is 20 mgKOH/g or more, preferably 30 mgKOH/g or more. If the acid value of the second acid-modified polyolefin is too small, the solubility in a dispersion for forming the resin layer may decrease and the effect due to the addition of the second acid-modified polyolefin may not be exerted satisfactorily. As a result, the smoothness of the formed resin layer may be deteriorated and therefore the adhesion between the plastic and the resin layer may be deteriorated. It is preferred for the second acid-modified polyolefin to have a higher acid value, but up to about 100 mgKOH/g. Therefore, the upper limit value of the acid value of the second acid-modified polyolefin is preferably 80 mgKOH/g or less.

The lower limit value of the melting point of the second acid-modified polyolefin is preferably higher than 90° C. If the melting point of the second acid-modified polyolefin is too low, the heat resistance may be deteriorated. It is preferred for the second acid-modified polyolefin to have a higher melting point, as long as the difference between the melting point of the second acid-modified polyolefin and the melting point of the first acid-modified polyolefin is 0° C. or more and less than 40° C. The melting point of the acid-modified polyolefin is affected by the composition of the polyolefin moiety in the acid-modified polyolefin or the like, and the actual limit is about 170° C. or lower. For these reasons, the upper limit value of the melting point of the second acid-modified polyolefin is preferably 170° C. or lower.

The upper limit value of the difference between the melting point of the first acid-modified polyolefin and the melting point of the second acid-modified polyolefin is preferably less than 40° C., more preferably 30° C. or less. The melting point of the first acid-modified polyolefin may be the same as the melting point of the second acid-modified polyolefin. Therefore, the lower limit value of the difference is 0° C. or more. If the difference is too large, the surface roughness of the resin layer cannot be decreased sufficiently, and therefore the adhesion between the plastic and the resin layer may be deteriorated. This is probably because, if the difference becomes too large, the compatibility of the first acid-modified polyolefin with the second acid-modified polyolefin is decreased.

The lower limit value of the number average molecular weight of the second acid-modified polyolefin is preferably 5,000 or more, more preferably 10,000 or more. The upper limit value of the number average molecular weight of the second acid-modified polyolefin is preferably 150,000 or less, more preferably 100,000 or less. If the molecular weight of the second acid-modified polyolefin is too small, the adhesive strength may be deteriorated. If the molecular weight of the second acid-modified polyolefin is too large, the solubility in a solvent may be deteriorated.

The melting point of the acid-modified polyolefin such as the first acid-modified polyolefin and the second acid-modified polyolefin can be controlled by varying the composition of a polyolefin moiety in the acid-modified polyolefin or the like. Namely, the acid-modified polyolefin can be produced by providing an unmodified polyolefin having a given melting point and then modifying the unmodified polyolefin with an acid. Hereinbelow, the control of the melting point will be described with an example in which a polypropylene is used as the unmodified polyolefin. The melting point of polypropylene varies depending on the structure thereof or the like, and is generally about 160° C. When an ethylene component is introduced into polypropylene to produce an ethylene-propylene copolymer, the melting point decreases. Therefore, the melting point of the acid-modified polyolefin can be controlled by varying the amount of an ethylene component to be introduced into polypropylene.

The resin layer may be any layer, as long as the first acid-modified polyolefin and the second acid-modified polyolefin are contained. The resin layer may be a layer composed only of the first acid-modified polyolefin and the second acid-modified polyolefin. Alternatively, the resin layer may contain another component, as long as the effects of the present invention cannot be deteriorated. Examples of the "another component" include inorganic particles and a thermoplastic resin other than the acid-modified polyolefin.

Examples of the inorganic particles include talc particles, calcium carbonate particles, and aluminum oxide particles. These inorganic particles may be used singly, or two or more types of the inorganic particles may be used in combination.

Examples of the thermoplastic resin include a polystyrene resin, an acrylonitrile-butadiene-styrene (ABS) copolymer, an acrylonitrile-EPDM(ethylene-propylene-diene rubber)-styrene (AES) copolymer, an acrylic resin, polybutadiene, a polyacetal resin, a polyether resin, poly(vinyl acetate), poly(vinyl chloride), and poly(vinylidene chloride). These thermoplastic resins may be used singly, or two or more types of the thermoplastic resins may be used in combination.

The content of the acid-modified polyolefin is preferably 80% by mass or more, more preferably 90% by mass or more, still more preferably 99.91% by mass or more, particularly preferably 99.95% by mass or more, most preferably 100% by mass (i.e., only the acid-modified polyolefin is contained as the resin in the resin layer), relative to the total amount of all of resin components in the resin layer.

The ratio of the content of the first acid-modified polyolefin to the content of the second acid-modified polyolefin is preferably 99:1 to 50:50 by mass, preferably 97:3 to 75:25 by mass. Namely, the lower limit value of the content of the second acid-modified polyolefin is preferably 1% by mass or more, more preferably 3% by mass or more, relative to the total mass of the first acid-modified polyolefin and the second acid-modified polyolefin. The upper limit value of the content of the second acid-modified polyolefin is preferably 50% by mass or less, more preferably 25% by mass or less. If the content of the second acid-modified polyolefin is too small, the effect due to the addition of the second acid-modified polyolefin may not be exerted satisfactorily, the smoothness of the formed resin layer may be deteriorated, and the adhesion between the plastic and the resin layer may be deteriorated. If the content of the second acid-modified polyolefin is too large, the content of the first acid-modified polyolefin becomes too small, and therefore the effect due to the addition of the first acid-modified polyolefin, e.g., heat resistance, may be deteriorated.

The acid-modified polyolefin is not particularly limited, as long as both of the first acid-modified polyolefin and the second acid-modified polyolefin are contained and the first acid-modified polyolefin and the second acid-modified polyolefin satisfy the above-mentioned requirements with respect to the acid value and the melting point. An example of the acid-modified polyolefin, such as the first acid-modified polyolefin and the second acid-modified polyolefin, is a polyolefin modified with an acid component such as a carboxylic acid, a carboxylic acid anhydride and a carboxylic acid derivative. Another example of the acid-modified polyolefin is a product produced by the graft polymerization of at last one component selected from the group consisting of an unsaturated dicarboxylic acid or an anhydride thereof and an ester derivative to a polyolefin-type resin.

Examples of the polyolefin include polyethylene, polypropylene, polybutene, polymethylpentene, a copolymer of an α-olefin and ethylene or propylene, an ethylene-(vinyl acetate) copolymer, an ethylene-(acrylic acid) copolymer, an ethylene-(methacrylic acid) copolymer, an ethylene-(maleic anhydride) copolymer, and a propylene-(maleic anhydride) copolymer. These exemplified polyolefins may be used singly, or two or more of them may be used in combination. From the viewpoint of the improvement in the adhesion between the metal sheet and the plastic, it is preferred that the polyolefin contains polypropylene, and it is more preferred that the polyolefin is composed of only polypropylene. Namely, it is preferred that the acid-modified polyolefin is acid-modified polypropylene.

The polypropylene may be a homopolypropylene (i.e., propylene homopolymer), or may be a copolymer of propylene and at least one component selected from the group consisting of ethylene, an α-olefin other than ethylene, and a vinyl compound. The α-olefin other than ethylene is preferably an α-olefin having 4 to 18 carbon atoms, and examples thereof include 1-butene, isobutene, 1-pentene, 4-methyl-1-pentene, 1-hexene, 1-octene, 1-decene, and 1-dodecene. From the viewpoint of the improvement in the adhesion between the metal sheet and the plastic, the polypropylene is particularly preferably homopolypropylene.

Examples of the unsaturated dicarboxylic acid include maleic acid, fumaric acid, citraconic acid, mesaconic acid, and itaconic acid. Examples of the anhydride of the unsaturated dicarboxylic acid include maleic anhydride, itaconic anhydride, and citraconic anhydride. An example of the ester derivative of the unsaturated dicarboxylic acid is monomethyl maleate. Among these components, an anhydride of the unsaturated dicarboxylic acid is preferred, and maleic anhydride is more preferred. These unsaturated dicarboxylic acids, the anhydrides thereof and the ester derivatives thereof may be used singly, or two or more of them may be used in combination.

As the acid-modified polyolefin, a commercially available product may be used. Examples of the commercially available product include "UNISTOLE (registered trademark)" series, "NOVATEC (registered trademark)" series manufactured by Japan Polypropylene Corporation, "Win Tech (registered trademark)" series, and "Prime Polypro (registered trademark)" series manufactured by Prime Polymer Co., Ltd.

The acid-modified polyolefin can be produced by, for example, the graft polymerization of an unsaturated dicarboxylic acid or an anhydride or an ester derivative thereof to the polyolefin by a conventional method. A polyolefin that is acid-modified with maleic anhydride (i.e., a (maleic anhydride)-modified polyolefin) can be produced by the addition of maleic anhydride to polyolefin. Specifically, the (maleic anhydride)-modified polyolefin) can be produced using xylene, 2,2,4-trimethyl-1,3-pentanediol diisobutyrate or the like as the solvent and by charging polypropylene, maleic anhydride and an organic peroxide (e.g., t-butylperoxy-2-ethylhexyl carbonate) sequentially in a proper order or simultaneously and then performing the graft polymerization of maleic anhydride to the polyolefin generally under heating at, for example, about 130 to 150° C. In this manner, a (maleic anhydride)-modified polyolefin can be produced.

The resin layer preferably has surface roughness of 12 μm or less in terms of arithmetic average roughness Ra. A surface-treated metal sheet for adhesion to polyolefin according to another embodiment of the present invention is provided with a metal sheet and a resin layer arranged on at least one surface of the metal sheet, wherein the resin layer contains an acid-modified polyolefin and the resin layer has surface roughness of 12 μm or less in terms of arithmetic average roughness Ra. When the resin layer is used, the bonding between the resin layer and the metal sheet and the bonding between the resin layer and the plastic can be achieved satisfactorily, as mentioned above. If the surface roughness of the resin layer is too large, the adhesiveness to the plastic may decrease. This is probably because, when the resin layer is bonded to the plastic, void spaces are formed easily in the interface between the resin layer and the plastic. A stress is concentrated in the void spaces, and it is considered that the void spaces may become a cause of breakage. Therefore, it is considered that the adhesiveness to the plastic is deteriorated because the void spaces that may cause breakage can be formed easily. When the resin layer has such small surface roughness that the arithmetic average roughness Ra is 12 μm or less, the adhesiveness to the plastic increases. Even when a polyolefin is used as the plastic, the surface-treated metal sheet for adhesion to polyolefin can satisfactorily exhibit the effect to improve the adhesiveness to the plastic due to the small surface roughness of the resin layer. For these reasons, the surface-treated metal sheet for adhesion to polyolefin has excellent adhesiveness to a metal sheet and a polyolefin. The surface roughness of the resin layer is preferably small as possible. Actually, the limit of the surface roughness is such that the arithmetic average roughness Ra is about 0.1 μm. Therefore, the lower limit value of the surface roughness of the resin layer is 0.1 μm or more in terms of arithmetic average roughness Ra. The arithmetic average roughness Ra can be measured by a method prescribed in JIS B0031:2003.

The lower limit value of the thickness (dried thickness) of the resin layer is preferably 5 μm or more, more preferably 10 μm or more. The upper limit value of the thickness of the resin layer is preferably 40 μm or less, more preferably 35 μm or less. If the resin layer is too thin, the adhesiveness to the metal sheet and the plastic may be deteriorated. If the resin layer is too thick, the effect to improve the adhesiveness to the metal sheet and the plastic may not be exhibited, the effort to increase the thickness of the resin layer may come to nothing, and the cost may become expensive. In addition, bubbles or the like may be formed easily in the resin layer.

The method for manufacturing the surface-treated metal sheet for adhesion to polyolefin, i.e., the method for forming the resin layer, is not particularly limited, as long as the resin layer contains the above-mentioned acid-modified polyolefin and can be formed on the metal sheet so as to have surface roughness of 12 μm or less in terms of arithmetic average roughness Ra. Namely, the resin layer can be formed by applying a coating solution containing the acid-modified polyolefin onto the metal sheet. As the coating solution, a coating solution containing the first acid-modified polyolefin and the second acid-modified polyolefin can be used for example. The resin layer formed using this coating solution is a layer containing the first acid-modified polyolefin and the second acid-modified polyolefin. When the first acid-modified polyolefin is introduced into a solvent, the first acid-modified polyolefin is dispersed, not dissolved, in the solvent to produce a dispersion. When the dispersion is used to faun the resin layer on the metal sheet, the surface roughness tends to increase, as mentioned above. When a dispersion containing the first acid-modified polyolefin as well as the second acid-modified polyolefin is used, a resin layer having higher smoothness can be formed. Therefore, a layer containing both of the first acid-modified polyolefin and the second acid-modified polyolefin can achieve surface roughness of 12 μm or less in terms of arithmetic average roughness Ra satisfactorily, and the adhesiveness to the plastic can also be improved satisfactorily. According to the above-mentioned manufacture method, it becomes possible to manufacture a surface-treated metal sheet for adhesion to polyolefin having satisfactorily high adhesiveness to the plastic even when a polyolefin is used as the plastic.

A specific example of the method for manufacturing the surface-treated metal sheet for adhesion to polyolefin is as follows. Firstly, a metal sheet having a clean surface is provided. Subsequently, a coating solution (i.e., a coating solution for forming resin layer) containing a mixture of the first acid-modified polyolefin and the second polyolefin is applied onto the metal sheet. If necessary, the metal sheet having the coating solution applied thereon is dried by heating. As a result, the resin layer is formed on the metal sheet. The coating solution can be prepared by introducing the mixture into a solvent and then stirring the resultant solution. Examples of the solvent include xylene and "SOLVESSO (registered trademark)". Examples of the coating method include a roll coater method, a spray method and a curtain flow coater method. The temperature and the time of the heating are not particularly limited. For example, the heating is carried out at around 200° C., at which the acid-modified polyolefin can be melted, for several tens of seconds to several minutes.

As mentioned above, the chemical conversion film may be arranged on the resin layer side of the metal sheet. Namely, the chemical conversion film may be provided for increasing the corrosion resistance of the metal sheet or for securing the adhesion between the metal sheet and the resin layer. In the chemical conversion film, colloidal silica may be added for the purpose of increasing the corrosion resistance of the metal sheet. In the chemical conversion film, a resin such as a thermocurable resin and a silane coupling agent may be added for the purpose of securing the adhesiveness to the resin layer. In the chemical conversion film, an acid may be added for the purpose of securing the chemical bonding between the metal sheet and the chemical conversion film. The amount of the chemical conversion film to be attached is not particularly limited, and is preferably 0.01 to 1 $g/m^2$, more preferably 0.05 to 0.5 $g/m^2$ in terms of a dried weight. If the amount of the chemical conversion film attaches is too small, the effect to improve the adhesive strength by the chemical conversion film may be insufficient. If the amount of the chemical conversion film attached is too large, the effect to improve the adhesive strength may become saturated and therefore may be a waste in cost.

It is preferred that the chemical conversion film contains colloidal silica. This is because colloidal silica has an effect to increase corrosion resistance. As the colloidal silica, "SNOWTEX (registered trademark)" series (colloidal silica manufactured by Nissan Chemical Corporation) "XS", "SS", "40", "N, "UP" and the like can be used preferably. Particularly, "SNOWTEX 40" which has a surface area average particle diameter of about 10 to 20 nm can be used preferably.

Examples of the resin to be used in the chemical conversion film include a thermocurable resin such as a water-based urethane resin, a water-based acrylic-modified epoxy resin and a water-based phenolic resin. The wording "water-based" means "water-soluble" or "water-dispersible (water-insoluble)". In the resin, an acid-modified polyolefin may be contained.

It is preferred to add a silane coupling agent to the coating solution to be used for forming the chemical conversion film. When a silane coupling agent is contained, the chemical conversion film can improve the adhesiveness to the metal substrate. Examples of the silane coupling agent include: an amino-group-containing silane coupling agent such as γ-aminopropyltrimethoxysilane, γ-aminopropyltriethoxysilane, N-(β-aminoethyl)-γ-aminopropyltrimethoxysilane and N-(β-aminoethyl)-γ-aminopropylmethyldimethoxyysilane; a glycidoxy-group-containing silane coupling agent such as γ-glycidoxypropyltrimethoxysilane, γ-glycidoxypropylmethyldimethoxysilane, γ-glycidoxypropyltriethoxysilane and γ-glycidoxymethyldimethoxysilane; a vinyl-group-containing silane coupling agent such as vinyltrimethoxysilane, vinyltriethoxysilane and vinyltris(β-methoxyethoxy)silane; a methacryloxy-group-containing silane coupling agent such as γ-methacryloxypropyltrimethoxysilane; a mercapto-group-containing silane coupling agent such as γ-mercaptopropyltrimethoxysilane and γ-mercaptopropylmethyldimethoxysilane; and a halogen-group-containing silane coupling agent such as γ-chloropropylmethoxysilane and γ-chloropropyltrimethoxysilane.

The method for forming the chemical conversion film is not particularly limited, as long as the chemical conversion film can be formed. The method for forming the chemical conversion film includes applying a coating solution (i.e., a coating solution for forming chemical conversion film) containing a resin, colloidal silica, a silane coupling agent and the like onto at least one surface of the metal substrate. The method for forming the chemical conversion film on the metal substrate is not particularly limited, and any conventional known coating method can be employed. For example, a coating solution for forming a chemical conversion film is applied on one surface or both surfaces of the metal substrate by a roll coater method, a spray method, a curtain flow coater method or the like and then the coating solution is dried by heating. The temperature to be employed for the drying by heating is not particularly limited. Because the coating solution for forming chemical conversion film is water-based, it is preferred to heat at about 100° C., at which water can be vaporized, for several tens of seconds to several minutes.

The surface-treated metal sheet for adhesion to polyolefin is used in combination with a resin molded article (a plastic). In this manner, it becomes possible to manufacture a composite member in which the plastic is provided on the resin layer in the surface-treated metal sheet for adhesion to polyolefin. Namely, the composite member includes the surface-treated metal sheet for adhesion to polyolefin and a plastic provided on the resin layer in the surface-treated metal sheet for adhesion to polyolefin. In this regard, in the case where it is needed to process the composite member, a product manufactured by the press molding of the surface-treated metal sheet for adhesion to polyolefin into a desired shape may be used. The surface-treated metal sheet for adhesion to polyolefin is placed in a mold in an injection molding machine and is then clamped, then a molten resin is injected into the mold, and the resultant product is solidified by cooling. In this manner, the composite member is manufactured. Namely, the method for manufacturing the composite member includes the steps of: processing the surface-treated metal sheet for adhesion to polyolefin into a predetermined shape; placing the surface-treated metal sheet for adhesion to polyolefin which has been processed into the predetermined shape in a plastic-made mold; and injecting a molten plastic into the plastic-made mold in which the surface-treated metal sheet for adhesion to polyolefin has been placed, thus adhering and bonding the surface-treated metal sheet for adhesion to polyolefin to the plastic. Of course, the surface-treated metal sheet for adhesion to polyolefin may be integrated with the resin by a press molding method. However, for taking the advantage of the beneficial characteristics of injection molding, i.e., time saving and high efficiency, it is preferred to employ an injection molding method.

The conditions for the injection molding may vary appropriately depending on the type of the resin constituting the molded article. In one example in which the resin for the molding article (i.e., plastic) is polypropylene, the cylinder temperature is 230 to 250° C., the mold temperature is 45 to 55° C., the injection retention time is 5 to 8 seconds, and the cooling time is about 20 to 30 seconds. When the injection molding is carried out under these conditions, a composite member can be manufactured in which the plastic and the surface-treated metal sheet for adhesion to polyolefin are bonded to each other tightly.

In the above-manufactured composite member, the plastic is bonded to the surface-treated metal sheet for adhesion to polyolefin satisfactorily. As mentioned above, even when a polyolefin is used as the plastic, the surface-treated metal sheet for adhesion to polyolefin has high adhesiveness to the plastic. Therefore, even when a plastic containing a polyolefin is used as the plastic, a composite member having excellent adhesion between the metal sheet and the plastic is good can be manufactured.

The plastic is not particularly limited, and any known resin for molded articles can be used. Examples of the plastic include a polyolefin such as polypropylene and a polyamide. Examples of the polyolefin include polyethylene, polypropylene and an ethylene-polypropylene copolymer. Among these components, polypropylene is preferably used for structural members and the like, because of the lightweight (low specific gravity), high strength and low cost thereof. As the plastic, a product produced by compounding reinforcing fibers into the polyolefin, i.e., the polyolefin reinforced with reinforcing fibers, is preferred. The plastic reinforced with reinforcing fibers has high strength as well as a small coefficient of thermal expansion, and therefore the generation of a heat stress at a bonded part between the plastic and the metal sheet in association with the change in temperature can be prevented. Examples of the reinforcing fibers include glass fibers and carbon fibers. In the plastic, a known additive such as a pigment, a dye, a flame retardant agent, an antibacterial agent, an antioxidant agent, a plasticizer and a lubricant may be added.

The adhesive strength between the metal sheet provided in the surface-treated metal sheet for adhesion to polyolefin in the composite member and the plastic is preferably 5 MPa or more, more preferably 6 MPa or more, still more preferably 8 MPa or more. When the surface-treated metal sheet for adhesion to polyolefin is used, the adhesive strength in the composite member can be increased satisfactorily.

In the description, various aspects of techniques are disclosed, as mentioned above. Among these techniques, the primarily techniques will be summarized as follows.

On aspect of the present invention is a surface-treated metal sheet for adhesion to polyolefin, the surface-treated metal sheet being provided with: a metal sheet; and a resin layer provided on at least one surface of the metal sheet, wherein: the resin layer contains an acid-modified polyolefin, the acid-modified polyolefin contains a first acid-modified polyolefin having an acid value of 5 mgKOH/g or less and a second acid-modified polyolefin having an acid value of 20 mgKOH/g or more and a melting point of higher than 90° C., and the difference between the melting point of the first acid-modified polyolefin and the melting point of the second acid-modified polyolefin is 0° C. or more and less than 40° C.

According to this configuration, it becomes possible to provide a surface-treated metal sheet for adhesion to polyolefin having excellent adhesiveness to a metal sheet and a plastic. The surface-treated metal sheet for adhesion to polyolefin can have excellent adhesiveness to a plastic even when a polyolefin is used as the plastic. Therefore, the surface-treated metal sheet for adhesion to polyolefin has excellent adhesiveness to a metal sheet and a polyolefin.

In the surface-treated metal sheet for adhesion to polyolefin, it is preferred that the resin layer has surface roughness of 12 μm or less in terms of arithmetic average roughness Ra.

According to this configuration, it becomes possible to further improve the adhesiveness of the surface-treated metal sheet for adhesion to polyolefin to a metal sheet and a polyolefin.

In the surface-treated metal sheet for adhesion to polyolefin, it is preferred that the ratio of the content of the first acid-modified polyolefin to the content of the second acid-modified polyolefin is 99:1 to 50:50 by mass.

According to this configuration, it becomes possible to further improve the adhesiveness of the surface-treated metal sheet for adhesion to polyolefin to a metal sheet and a polyolefin.

Another aspect of the present invention is a surface-treated metal sheet for adhesion to polyolefin, the surface-treated metal sheet being provided with: a metal sheet; and a resin layer provided on at least one surface of the metal sheet, wherein: the resin layer contains an acid-modified polyolefin, and the resin layer has surface roughness of 12 μm or less in terms of arithmetic average roughness Ra.

According to this configuration, it becomes possible to provide a surface-treated metal sheet for adhesion to polyolefin which has excellent adhesiveness to a metal sheet and a plastic. The surface-treated metal sheet for adhesion to polyolefin has excellent adhesiveness to a plastic even when a polyolefin is used as the plastic. Therefore, the surface-treated metal sheet for adhesion to polyolefin has excellent adhesiveness to a metal sheet and a polyolefin.

Another aspect of the present invention is a composite member including the surface-treated metal sheet for adhesion to polyolefin, and a plastic provided on the resin layer in the surface-treated metal sheet for adhesion to polyolefin, wherein the plastic contains a polyolefin.

According to this configuration, it becomes possible to provide a composite complex in which the plastic is bonded to the surface-treated metal sheet for adhesion to polyolefin satisfactorily. Namely, a composite member in which the adhesion between the metal sheet and the plastic is excellent can be manufactured. As mentioned above, the surface-treated metal sheet for adhesion to polyolefin can be bonded to a plastic satisfactorily even when the plastic to be bonded to the surface-treated metal sheet for adhesion to polyolefin is a polyolefin. Therefore, a composite member in which the polyolefin that is served as the plastic is bonded to the surface-treated metal sheet for adhesion to polyolefin satisfactorily can be manufactured.

Still another aspect of the present invention is a method for manufacturing a composite member, the method including the steps of: processing the surface-treated metal sheet for adhesion to polyolefin into a predetermined shape; placing the surface-treated metal sheet for adhesion to polyolefin, which has been processed into the predetermined shape, in a mold for plastic molding use; and injecting a molten plastic into the mold for plastic molding use in which the surface-treated metal sheet for adhesion to polyolefin has been placed, thus adhering and bonding the surface-treated metal sheet for adhesion to polyolefin and the plastic to each other, wherein the plastic contains a polyolefin.

According to this configuration, it becomes possible to manufacture a composite member in which the plastic containing the polyolefin is bonded to the surface-treated metal sheet for adhesion to polyolefin satisfactorily, i.e., a composite member in which the adhesion between the metal sheet and the plastic is excellent.

According to the present invention, it becomes possible to provide a surface-treated metal sheet for adhesion to polyolefin which has excellent adhesiveness to a metal sheet and a polyolefin. According to the present invention, it also becomes possible to provide: a composite member which has excellent adhesiveness to a metal sheet and a plastic; and a method for manufacturing the composite member.

Hereinbelow, the present invention will be described more specifically with reference to examples. However, the scope of the present invention is not limited to these examples.

EXAMPLES

Firstly, the measurement methods and the evaluation methods employed in Examples and Comparative Examples will be described.

[Surface Roughness Ra]

The surface roughness of a resin layer in each of surface-treated metal sheets manufactured in the below-mentioned manufacture method was measured by a method prescribed in JIS B0031:2003.

[Adhesiveness (Adhesive Strength)]

In each of composite members manufactured by the below-mentioned manufacture method, a length-direction end part of a surface-treated metal sheet and a length-direction end part of a plastic were grasped by a chuck of a tensile test machine under an atmosphere of 25° C. and were then pulled at a tensile rate of 10 mm/min, and the tensile strength at the detachment of the plastic from the surface-treated metal sheet was measured. The measurement value was employed as adhesive strength. In this regard, the length-direction end part of the surface-treated metal sheet refers to an end part which was not covered with the plastic, and the length-direction end part of the plastic refers to an end part to which surface-treated metal sheet was not bonded.

Example 1

(Coating Solution for Forming Resin Layer)
Dispersion 1

A polyolefin having a propylene content of 100% by mass (homopolypropylene, "NOVATEC MA3" manufactured by Japan Polypropylene Corporation) (1 kg) was charged into a reaction vessel and was then subjected to a thermal degradation reaction (i.e., a reaction for cleaving a part of a polyolefin molecule by heating to adjust the size of the molecule) under nitrogen gas stream and ambient pressure at 360° C. for 30 minutes. The resultant polyolefin (98 parts by mass), maleic anhydride (2 parts by mass) and dicumyl peroxide (0.3 part by mass) were charged into a reaction vessel, and were then reacted under stirring at 180° C. for 3 hours. In this manner, an acid-modified polyolefin having an acid value of 4.7 mgKOH/g, a number average molecular weight of 12000 and a melting point of 140° C. was manufactured. This product was used as a first acid-modified polyolefin. The first acid-modified polyolefin was pulverized. The pulverized first acid-modified polyolefin was dispersed in SOLVESSO 150 so that the concentration of the first acid-modified polyolefin became 20% by mass. A dispersion thus manufactured was named as dispersion 1.

Dissolved Solution 2

A polyolefin (a propylene/ethylene copolymer, "Win Tech WFWST" manufactured by Japan Polypropylene Corporation) (1 kg) was charged into a reaction vessel, and was then subjected to a thermal degradation reaction under nitrogen gas stream and ambient pressure at 340° C. for 30 minutes. The resultant polyolefin (92 parts by mass), maleic anhydride (8 parts by mass) and dicumyl peroxide (1.2 parts by mass) were charged into a glass-made reaction vessel, and the mixture was then reacted under stirring at 180° C. for 3 hours. In this manner, an acid-modified polyolefin having an acid value of 45 mgKOH/g, a number average molecular weight of 21000 and a melting point of 125° C. was manufactured. This product was used as a second acid-modified polyolefin. The second acid-modified polyolefin was pulverized. The pulverized second acid-modified polyolefin was dispersed in SOLVESSO 150 so that the concentration of the second acid-modified polyolefin became 10% by mass. A dissolved solution thus manufactured was named as dissolved solution 2.

Coating Solution for Forming Resin Layer

The dispersion 1 and the dissolved solution 2 were mixed together so that the ratio of the content of the first acid-modified polyolefin and the content of the second polyolefin became 95:5 by mass. A solution thus prepared was used as a coating solution for forming resin layer.

(Surface-Treated Metal Sheet)

A hot-dip galvannealed steel sheet having a thickness of 1 mm was provided. This hot-dip galvannealed steel sheet was a steel sheet in which both surfaces were plated and the plated amount on each of the surfaces was 30 g/m$^2$. Both surfaces of the hot-dip galvannealed steel sheet were subjected to a substrate treatment using CTE-213A manufactured by Nihon Parkerizing Co., Ltd. so that the plated amount on each of the surfaces became 100 mg/m$^2$. The coating solution for forming resin layer was applied onto a surface of the substrate-treated hot-dip galvannealed steel sheet with a bar coater so that the thickness of a resin layer of a final product surface-treated metal sheet became a value (18 μm) shown in Table 2. Subsequently, the hot-dip galvannealed steel sheet having the coating solution for forming resin layer applied thereon was heated at 220° C. for 2 minutes. In this manner, a surface-treated metal sheet for adhesion to polyolefin was manufactured.

(Composite Member)

Next, injection molding was carried out using an injection molding machine ("PNX60" manufactured by Nissei Plastic Industrial Co., Ltd.). Firstly, the surface-treated metal sheet was cut into a piece having a size of 100 mm×25 mm, and the piece was placed in a mold. Subsequently, polypropylene ("Prime Polypro (registered trademark) E7000" manufactured by Prime Polymer Co., Ltd.) containing glass fiber in an amount of 30% by mass was melted, and a composite member provided with the plastic having a size of 100 mm long×25 mm wide×3 mm thick was obtained. In the resultant composite material, the plastic was adhered onto the surface-treated metal sheet so as not to cover the entire surface of the surface-treated metal sheet, and the plastic and the surface-treated metal sheet were superposed on each other only in an area having a size of 12.5 mm long×25 mm wide (i.e., only a part of the surface of the surface-treated metal sheet was covered with the plastic). The injection conditions are shown in Table 1.

TABLE 1

| MOLDING MACHINE | | INJECTION MOLDING MACHINE "PNX60" MANUFACTURED BY NISSEI PLASTIC INDUSTRIAL CO., LTD. |
|---|---|---|
| SHAPE OF MOLDED ARTICLE | | 100 × 25 × 3.0 mm (INSERT SIDE: 0.8 mmt) |
| CYLINDER TEMPERATURE (° C.) | NOZZLE | 240 |
| | FRONT PART | 250 |
| | CENTRAL PART | 250 |
| | REAR PART | 240 |
| | REARMOST PART | 230 |
| MOLD TEMPERATURE (° C.) | | 45~55 |
| INJECTION PRESSURE | LIMIT PRESSURE (MPa) | 40 |
| | HOLDING PRESSURE (MPa) | 50 |
| FILLING RATE (mm/s) | | 10 |
| ROTATIONAL SPEED OF SCREW (rpm) | | 80 |
| BACK PRESSURE (MPa) | | 5.0 |

TABLE 1-continued

| SETTINGS | | |
|---|---|---|
| | INJECTION HOLDING PRESSURE TIME (s) | 6.5 |
| | COOLING TIME (s) | 25.0 |
| | INTERMEDIATE TIME (s) | 0.3 |
| | METERING FINISHING POSITION (mm) | 30.0 |
| | V-P SWITCHING POSITION (mm) | 7.5 |
| ACTUAL MEASUREMENTS | METERING (s) | 7.38 |
| | PACKING (s) | 2.47 |
| | 1 CYCLE(s) | — |

Example 2 and Example 3

The same procedure as in Example 1 was carried out, except that the thickness of a resin layer in a final product surface-treated metal sheet became each of values (21 μm, 13 μm) shown in Table 2. In this manner, surface-treated metal sheets for adhesion to polyolefin were manufactured.

Example 4 and Example 5

Dissolved Solution 3

A polyolefin (a propylene/ethylene copolymer, "Win Tech WFW6" manufactured by Japan Polypropylene Corporation) (1 kg) was charged into a reaction vessel and was then subjected to a thermal degradation reaction under nitrogen gas stream and ambient pressure at 350° C. for 30 minutes. The resultant polyolefin (92 parts by mass), maleic anhydride (8 parts by mass) and dicumyl peroxide (1.2 parts by mass) were charged into a glass-made reaction vessel, and the mixture was then reacted under stirring at 180° C. for 3 hours. In this manner, an acid-modified polyolefin having an acid value of 48 mgKOH/g, a number average molecular weight of 21000 and a melting point of 108° C. was manufactured. This product was used as a second acid-modified polyolefin. The second acid-modified polyolefin was pulverized. The pulverized second acid-modified polyolefin was dispersed in SOLVESSO 150 so that the concentration of the second acid-modified polyolefin became 10% by mass. A dissolved solution thus manufactured was named as dissolved solution 3.

The same procedure as in Example 1 was carried out, except that the dissolved solution 3 was used in place of the dissolved solution 2 and the thickness of a resin layer in a final product surface-treated metal sheet was changed to each of the values shown in Table 2. In this manner, surface-treated metal sheets for adhesion to polyolefin were manufactured.

Comparative Example 1

Dissolved Solution 4

A polyolefin (soft propylene, "WELNEX RFX4V" manufactured by Japan Polypropylene Corporation) (1 kg) was charged into a reaction vessel and was then subjected to a thermal degradation reaction under nitrogen gas stream and ambient pressure at 340° C. for 30 minutes. The resultant polyolefin (92 parts by mass), maleic anhydride (8 parts by mass) and dicumyl peroxide (1.2 parts by mass) were charged into a glass-made reaction vessel, and the mixture was then reacted under stirring at 180° C. for 3 hours. In this manner, an acid-modified polyolefin having an acid value of 50 mgKOH/g, a number average molecular weight of 22000 and a melting point of 97° C. was manufactured. This product was used as a second acid-modified polyolefin. The second acid-modified polyolefin was pulverized. The pulverized second acid-modified polyolefin was dispersed in SOLVESSO 150 so that the concentration of the second acid-modified polyolefin became 10% by mass. A dissolved solution thus manufactured was named as dissolved solution 4.

The same procedure as in Example 1 was carried out, except that the dissolved solution 4 was used in place of the dissolved solution 2. In this manner, a surface-treated metal sheet was manufactured.

Comparative Example 2

The same procedure as in Example 1 was carried out, except that a coating solution for forming resin layer which was composed of only the dispersion 1 was used. In this manner, a surface-treated metal sheet was manufactured.

The adhesive strength of each of the composite members was measured in the above-mentioned manner. The results are shown in Table 2.

TABLE 2

| | | FIRST ACID-MODIFIED POLYOLEFIN | | | | SECOND ACID-MODIFIED POLYOLEFIN | |
|---|---|---|---|---|---|---|---|
| | | MELTING POINT (° C.) | ACID VALUE (mgKOH/g) | NUMBER AVERAGE MOLECULAR WEIGHT | CONTENT (MASS %) | MELTING POINT (° C.) | ACID VALUE (mgKOH/g) |
| EXAMPLES | 1 | 140 | 4.7 | 12000 | 95 | 125 | 45 |
| | 2 | | | | | | |
| | 3 | | | | | | |
| | 4 | | | | | | 108 | 48 |
| | 5 | | | | | | |
| COMPARATIVE EXAMPLES | 1 | 140 | 4.7 | 12000 | 95 | 97 | 50 |
| | 2 | | | | 100 | — | |

| | | SECOND ACID-MODIFIED POLYOLEFIN | | DIFFERENCE IN MELTING POINT (° C.) | THICKNESS OF RESIN LAYER (μm) | SURFACE ROUGHNESS RA (μm) | ADHESIVE STRENGTH (MPa) |
|---|---|---|---|---|---|---|---|
| | | NUMBER AVERAGE MOLECULAR WEIGHT | CONTENT (MASS %) | | | | |
| EXAMPLES | 1 | 21000 | 5 | 15 | 18 | 10 | 12.3 |
| | 2 | | | | 21 | 12 | 13.6 |

TABLE 2-continued

|  |  |  |  |  |  |  |  |
|---|---|---|---|---|---|---|---|
|  | 3 |  |  |  | 13 | 8 | 7.2 |
|  | 4 | 21000 | 5 | 32 | 18 | 12 | 6.5 |
|  | 5 |  |  |  | 21 | 12 | 9.7 |
| COMPARATIVE | 1 | 22000 | 5 | 43 | 18 | 15 | 4.5 |
| EXAMPLES | 2 |  | — |  | 18 | 15 | 4.9 |

As apparent from Table 2, in the case where a first acid-modified polyolefin which had an acid value of 5 mgKOH/g or less and a second acid-modified polyolefin which had an acid value of 20 mgKOH/g or more and a melting point of higher than 90° C. and of which the difference in melting point from the first acid-modified polyolefin was 0° C. or more and less than 40° C. were contained (Examples 1 to 5), the surface roughness Ra was 12 μm or less. Each of the surface-treated metal sheets for adhesion to polyolefin of Examples 1 to 5 had higher adhesive strength than the case where a second acid-modified polyolefin of which the difference in melting point from the first acid-modified polyolefin was more than 40° C. was used (Comparative Example 1). Each of the surface-treated metal sheets for adhesion to polyolefin of Examples 1 to 5 had higher adhesive strength than the case where only the first acid-modified polyolefin was used (Comparative Example 2).

This application claims priority from Japanese Patent Application No. 2017-066113, filed on Mar. 29, 2017, the entire contents of which are incorporated herein by reference.

To express the present invention, the present invention is properly and fully described with reference to the embodiments. However, it should be recognized that modifications and/or improvements of the embodiments described above can be made by those skilled in the art easily. Accordingly, it is construed that the modifications and/or improvements made by those skilled in the art are encompassed by the scope of the claims set forth in the section "Claims", as long as the modifications and/or improvements do not depart from the scope of the appended claims.

INDUSTRIAL APPLICABILITY

According to the present invention, it becomes possible to provide a surface-treated metal sheet for adhesion to polyolefin having excellent adhesiveness to a metal sheet and a polyolefin. According to the present invention, it also becomes possible to provide: a composite member in which the adhesion between a metal sheet and a plastic is excellent; and a method for manufacturing the composite member.

The invention claimed is:

1. A surface-treated metal sheet for adhesion to polyolefin, the surface-treated metal sheet comprising:
a metal sheet; and
a resin layer provided on at least one surface of the metal sheet,
wherein:
the resin layer contains an acid-modified polyolefin,
the acid-modified polyolefin contains a first acid-modified polyolefin having an acid value of 4 to 5 mgKOH/g and a melting point of 130° C. or higher, and a second acid-modified polyolefin having an acid value of 20 mgKOH/g or more and a melting point of higher than 90° C.,
a ratio of a content of the first acid-modified polyolefin to a content of the second acid-modified polyolefin is 99:1 to 50:50 by mass,
a content of the acid-modified polyolefin is 90% by mass or more, relative to the total amount of all of resin components in the resin layer,
a difference between the melting point of the first acid-modified polyolefin and the melting point of the second acid-modified polyolefin is 0° C. or more and less than 40° C., and
the resin layer has surface roughness of 12 μm or less in terms of arithmetic average roughness Ra.

2. The surface-treated metal sheet according to claim 1, wherein the resin layer has surface roughness of 0.1 μm or more and 12 μm or less in terms of arithmetic average roughness Ra.

3. The surface-treated metal sheet according to claim 1, wherein the resin layer is dried and has a thickness of 13 μm or more.

4. A composite member, comprising:
the surface-treated metal sheet according to claim 1; and
a plastic provided on the resin layer in the surface-treated metal sheet,
wherein the plastic contains a polyolefin.

5. A method for manufacturing a composite member, the method comprising:
processing the surface-treated metal sheet according to claim 1 into a predetermined shape;
placing the surface-treated metal sheet, which has been processed into the predetermined shape, in a mold for plastic molding use; and
injecting a molten plastic into the mold in which the surface-treated metal sheet has been placed, thus adhering and bonding the surface-treated metal sheet and the plastic to each other,
wherein the plastic contains a polyolefin.

* * * * *